United States Patent
Ligneul et al.

(10) Patent No.: US 12,146,777 B2
(45) Date of Patent: Nov. 19, 2024

(54) FLUID COMPONENT DETERMINATION USING THERMAL PROPERTIES

(71) Applicant: Schlumberger Technology Corporation, Sugar Land, TX (US)

(72) Inventors: Patrice Ligneul, Chaville (FR); Mustapha Abbad, Al-Khobar (SA); Nicolas Renoux, Versailles (FR); Marian Faur, Palaiseau (FR)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 45 days.

(21) Appl. No.: 18/317,343

(22) Filed: May 15, 2023

(65) Prior Publication Data

US 2023/0280194 A1 Sep. 7, 2023

Related U.S. Application Data

(62) Division of application No. 16/309,604, filed as application No. PCT/US2017/036263 on Jun. 7, 2017, now Pat. No. 11,692,859.

(30) Foreign Application Priority Data

Jun. 13, 2016 (EP) .................................. 16290106

(51) Int. Cl.
*G01F 1/68* (2006.01)
*E21B 34/06* (2006.01)
(Continued)

(52) U.S. Cl.
CPC ............. *G01F 1/68* (2013.01); *E21B 47/07* (2020.05); *E21B 47/103* (2020.05); *E21B 49/08* (2013.01);
(Continued)

(58) Field of Classification Search
CPC . G01F 1/42; G01F 1/50; G01F 1/6845; G01F 1/699; G01F 1/74; G01F 1/88;
(Continued)

(56) References Cited

U.S. PATENT DOCUMENTS 6,169,965 B1   1/2001  Kubisiak
6,176,323 B1 * 1/2001  Weirich ................ E21B 44/005
                                                               175/40

(Continued)

FOREIGN PATENT DOCUMENTS

EP        0597530 A1    5/1994
EP        2985410 A1    2/2016
(Continued)

OTHER PUBLICATIONS

Brinkman, H.C. "The Viscosity of Concentrated Suspensions and Solutions" Journal of Chemical Physics, vol. 20, (Apr. 1952) p. 571.

(Continued)

*Primary Examiner* — Kristina M Deherrera
*Assistant Examiner* — Gedeon M Kidanu
(74) *Attorney, Agent, or Firm* — Jeffrey D. Frantz

(57) ABSTRACT

Methods for determining phase fractions of a downhole fluid via thermal properties of the fluids are provided. In one embodiment, a method includes measuring a temperature of a fluid flowing through a completion string downhole in a well and heating a resistive element of a thermal detector at a position along the completion string downhole in the well by applying power to the resistive element such that heat from the resistive element is transmitted to the fluid flowing by the position. The method also includes determining, via the thermal detector, a flow velocity of the fluid through the completion string and multiple thermal properties of the fluid, and using the determined flow velocity and the multiple thermal properties to determine phase fractions of the (Continued)

fluid. Additional systems, devices, and methods are also disclosed.

10 Claims, 7 Drawing Sheets

(51) Int. Cl.
| | | |
|---|---|---|
| E21B 47/07 | (2012.01) | |
| E21B 47/103 | (2012.01) | |
| E21B 49/08 | (2006.01) | |
| G01F 1/44 | (2006.01) | |
| G01F 1/74 | (2006.01) | |
| G01K 1/00 | (2006.01) | |
| G01K 13/02 | (2021.01) | |
| G01N 25/00 | (2006.01) | |
| G01N 25/18 | (2006.01) | |

(52) U.S. Cl.
CPC .............. *G01F 1/44* (2013.01); *G01F 1/74* (2013.01); *G01K 1/00* (2013.01); *G01K 13/02* (2013.01); *G01N 25/00* (2013.01); *G01N 25/18* (2013.01); *E21B 34/06* (2013.01); *E21B 49/0875* (2020.05)

(58) Field of Classification Search
CPC ......... G01N 25/60; E21B 43/24; E21B 47/06; E21B 47/10; E21B 49/081; E21B 49/10; E21B 21/08; E21B 31/03; E21B 33/1208; E21B 36/00; E21B 44/00; E21B 44/005; E21B 47/00; E21B 47/002; E21B 47/07; E21B 47/085; E21B 47/11; E21B 47/113; E21B 47/114; E21B 49/005
See application file for complete search history.

(56) References Cited

U.S. PATENT DOCUMENTS

| | | | |
|---|---|---|---|
| 6,755,247 B2 | 6/2004 | Moake et al. | |
| 6,889,544 B2* | 5/2005 | Tanimoto | G01F 1/699 |
| | | | 73/204.15 |
| 7,424,366 B2 | 9/2008 | Angelescu | |
| 7,637,167 B2 | 12/2009 | Monmont | |
| 7,952,047 B2 | 5/2011 | Gevelber | |
| 9,753,179 B2 | 9/2017 | Adil | |
| 10,100,638 B2 | 10/2018 | Wang | |
| 10,458,894 B2 | 10/2019 | Xu | |
| 2008/0083273 A1* | 4/2008 | Sroka | E21B 49/10 |
| | | | 73/152.55 |
| 2009/0151937 A1* | 6/2009 | Goodwin | E21B 33/1208 |
| | | | 166/57 |
| 2009/0266175 A1* | 10/2009 | Monmont | E21B 47/10 |
| | | | 73/861.04 |
| 2011/0267074 A1 | 11/2011 | Xie | |
| 2012/0253705 A1 | 10/2012 | Chen et al. | |
| 2014/0076547 A1 | 3/2014 | Unalmis et al. | |
| 2014/0355737 A1 | 12/2014 | Korkin et al. | |
| 2015/0177042 A1 | 6/2015 | Song | |
| 2016/0054162 A1 | 2/2016 | Hollaender et al. | |
| 2017/0350843 A1 | 12/2017 | Mohr | |
| 2019/0162568 A1* | 5/2019 | Ligneul | G01K 13/02 |

FOREIGN PATENT DOCUMENTS

| | | |
|---|---|---|
| WO | 2009023668 A1 | 2/2009 |
| WO | 2012000654 A1 | 1/2012 |
| WO | 2015099762 A1 | 7/2015 |
| WO | 2015137915 A1 | 9/2015 |

OTHER PUBLICATIONS

Kuijk, J. Van et al, "Multi-Parameter Detection in Fluid Flows" Elsevier Science SA (1995), pp. 369-372.
Marshall, D.C., "Measurement of SAP Flow in Conifers by Heat Transport", Plant Physiology, vol. 33, No. 6 (Nov. 1958) pp. 385-396.
Zhang, Haifeng et al, "A Dual-Thermistor Probe for Absolute Measurement of Thermal Diffusivity and Thermal Conductivity by the Heat Pulse Method", Meas. Sci. Technol., vol. 14, (2003), pp. 1396-1401.
European Extended Search Report for corresponding European Application Serial No. 16290106.0, dated Dec. 22, 2016, 20 pages.
European Office Action—Article 94(3) for corresponding European Application Serial No. 16290106.0, dated Oct. 31, 2018, 10 pages.
International Search Report and Written Opinioin issued in PCT application PCT/US2017/036263, dated Aug. 25, 2017 (19 pages).
International Preliminary Report on Patentability issued in PCT application PCT/US2017/036263, dated Dec. 18, 2018 (15 pages).
Communication under Rule 71(3) issued in EP application 16290106.0, dated Jul. 4, 2019 (5 pages).

* cited by examiner

FLUID COMPONENT DETERMINATION USING THERMAL PROPERTIES

CROSS-REFERENCE TO RELATED APPLICATIONS

This application is a divisional of U.S. patent application Ser. No. 16/309,604, filed on Dec. 13, 2018, which was the National Stage of International Application No. PCT/US2017/036263, filed on Jun. 7, 2017, which claims the benefit of, and priority to EP patent application Ser. No. 16/290,106.0, filed on Jun. 13, 2016. Each of the above applications is incorporated herein by reference in its entirety.

BACKGROUND

Wells are generally drilled into subsurface rocks to access fluids, such as hydrocarbons, stored in subterranean formations. The subterranean fluids can be produced from these wells through known techniques. Various equipment can be used to complete such wells and facilitate production. Further, sensors can be deployed in a well to measure downhole properties of interest, such as temperature and pressure.

Operators may want to know certain characteristics of the well to aid production. For example, operators may want to know flow rates of produced fluids from particular zones in the well. Such flow rate data can be used for numerous purposes, including to identify and diagnose potential flow problems and to determine which flowing zones are producing hydrocarbon fluids. In some instances, temperature data may be collected from the well and used to infer flow information.

SUMMARY

Certain aspects of some embodiments disclosed herein are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below.

In one embodiment of the present disclosure, a method includes measuring a temperature of a fluid flowing through a completion string downhole in a well. The method further includes heating a resistive element of a thermal detector at a position along the completion string downhole in the well by applying power to the resistive element such that heat from the resistive element is transmitted to the fluid flowing by the position. The method also includes determining, via the thermal detector, a flow velocity of the fluid through the completion string and multiple thermal properties of the fluid. The determined flow velocity and multiple thermal properties can be used to determine phase fractions of the fluid.

In an additional embodiment, an apparatus includes a completion string installed in a well and a thermal detector positioned along the completion string downhole in the well. The apparatus includes an analysis system for determining thermal characteristics of a downhole fluid flowing through the completion string based on measurements acquired with the thermal detector. The analysis system can also determine phase fractions of the downhole fluid using the determined thermal characteristics.

In another embodiment of the present disclosure, a method includes determining thermal properties of a fluid flowing through a conduit. Determining the thermal properties can include applying electrical impulses to a heating element of a thermal detector positioned such that heat from the heating element is advected by the flowing fluid, and assessing the thermal properties of the flowing fluid via the response of the heating element. Additionally, the method includes determining phase fractions of the flowing fluid using the determined thermal properties and a flow rate of the flowing fluid.

Various refinements of the features noted above may exist in relation to various aspects of the present embodiments. Further features may also be incorporated in these various aspects as well. These refinements and additional features may exist individually or in any combination. For instance, various features discussed below in relation to the illustrated embodiments may be incorporated into any of the above-described aspects of the present disclosure alone or in any combination. Again, the brief summary presented above is intended just to familiarize the reader with certain aspects and contexts of some embodiments without limitation to the claimed subject matter.

BRIEF DESCRIPTION OF THE DRAWINGS

These and other features, aspects, and advantages of certain embodiments will become better understood when the following detailed description is read with reference to the accompanying drawings in which like characters represent like parts throughout the drawings, wherein.

DETAILED DESCRIPTION OF SPECIFIC EMBODIMENTS

It is to be understood that the present disclosure provides many different embodiments, or examples, for implementing different features of various embodiments. Specific examples of components and arrangements are described below for purposes of explanation and to simplify the present disclosure. These are, of course, merely examples and are not intended to be limiting.

When introducing elements of various embodiments, the articles "a," "an," "the," and "said" are intended to mean that there are one or more of the elements. The terms "comprising," "including," and "having" are intended to be inclusive and mean that there may be additional elements other than the listed elements. Moreover, any use of "top," "bottom," "above," "below," other directional terms, and variations of these terms is made for convenience, but does not mandate any particular orientation of the components.

Embodiments of the present disclosure generally relate to fluid characterization. More particularly, in at least some embodiments, a thermal detector is used to determine thermal characteristics of a fluid, and the thermal characteristics are used to further characterize the fluid. For example, in certain embodiments, the thermal characteristics are used to determine phase fractions of a multiphase fluid (e.g., a fluid emulsion having gas, oil, and water). In at least one embodiment, thermal detectors spaced along a downhole completion string in a well are used to determine thermal characteristics at different locations within the completion string, which are then used to determine phase fractions of the fluid in the completion string at the different locations. The determined phase fractions can also be used to regulate flow into the completion string, such as by using the determined phase fractions in controlling inflow control devices of the completion string.

Figure 1:
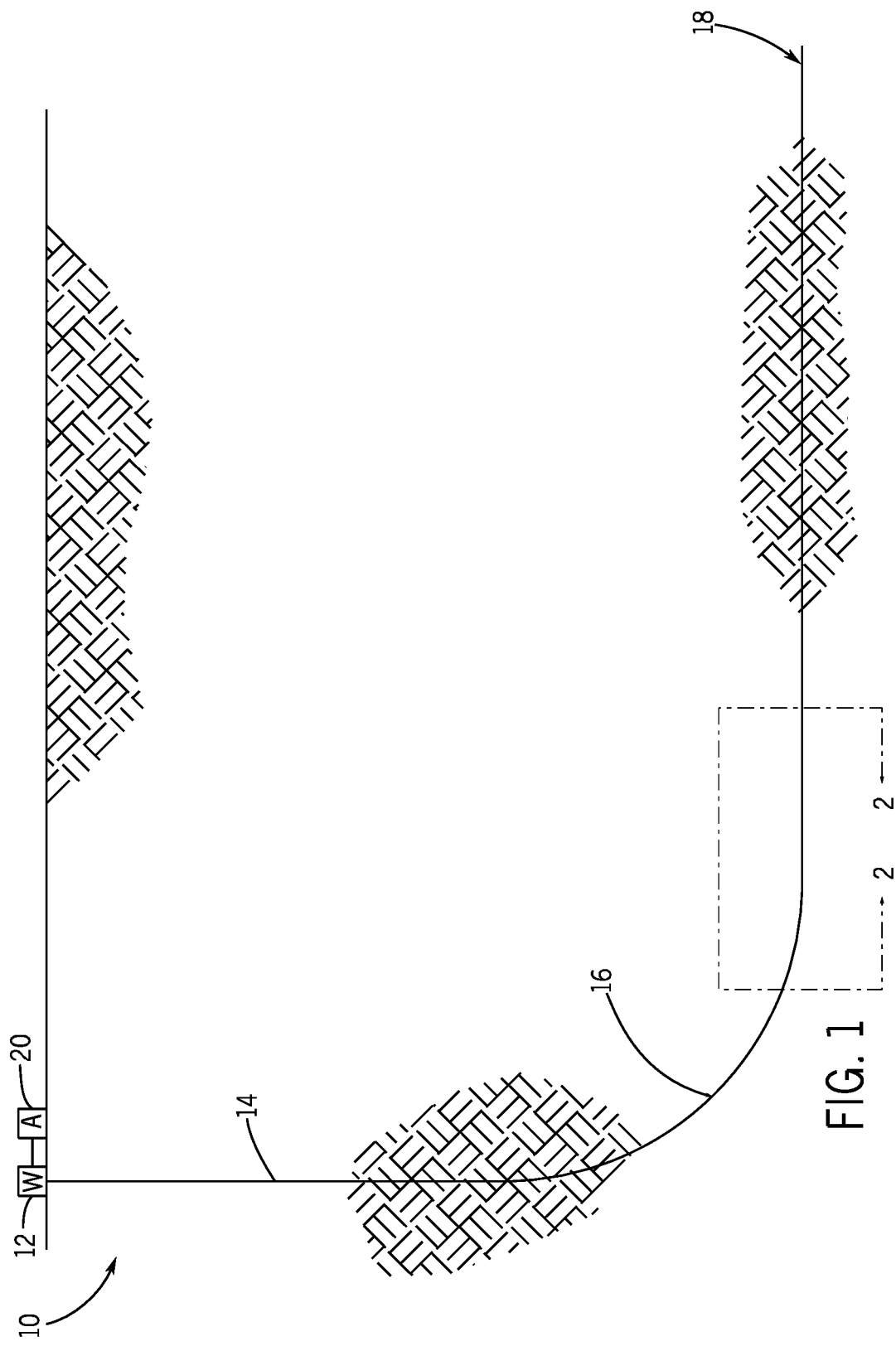
FIG. 1 generally depicts a well, through which formation fluid may flow to the surface, and an analysis system for determining characteristics of the formation fluid in accordance with one embodiment of the present disclosure.

Turning now to the drawings, a well system 10 is generally depicted in FIG. 1 in accordance with one embodiment. While certain elements of the system 10 are depicted in this figure and generally discussed below, it will be appreciated that the system 10 may include other components in addition to, or in place of, those presently illustrated and discussed. The system 10 includes a wellhead 12 mounted over a well 14 extending through subterranean formations. As will be appreciated, wells can include various completion strings (e.g., casing, liners, and tubing) and other equipment to facilitate production of formation fluids, such as oil and gas. For example, casing strings can be cemented within the well 14 and production tubing can be suspended in the well 14 (e.g., from the wellhead 12) to facilitate production of formation fluids up to the surface.

The well 14 is depicted in FIG. 1 as a horizontal well with a lateral portion extending from a heel 16 to a toe 18 of the well 14. In different embodiments, the well 14 could take another form, such as a multilateral well or a vertical well. Further, the well 14 could be an offshore well or an onshore well in various embodiments.

An analysis system 20 (e.g., a programmed computer system) is also shown in FIG. 1. The analysis system 20 processes data from sensors in the well 14 to facilitate characterization of the well 14. By way of example, pressure and temperature sensors can be provided in the well 14, and the analysis system 20 can process measurements from these sensors to determine various well characteristics (e.g., a flow profile that includes flow rates from a formation into the well at different depths during production). The analysis system 20 can be located at the wellsite, but the analysis system 20 could be provided remote from the wellsite in some embodiments. The analysis system 20 could also be provided as a distributed system in which some components are provided at a wellsite and others are not. For example, data could be collected from downhole sensors by a portion of the analysis system 20 at the wellsite and then communicated to a remote location for processing by another portion of the analysis system 20.

Figure 2:
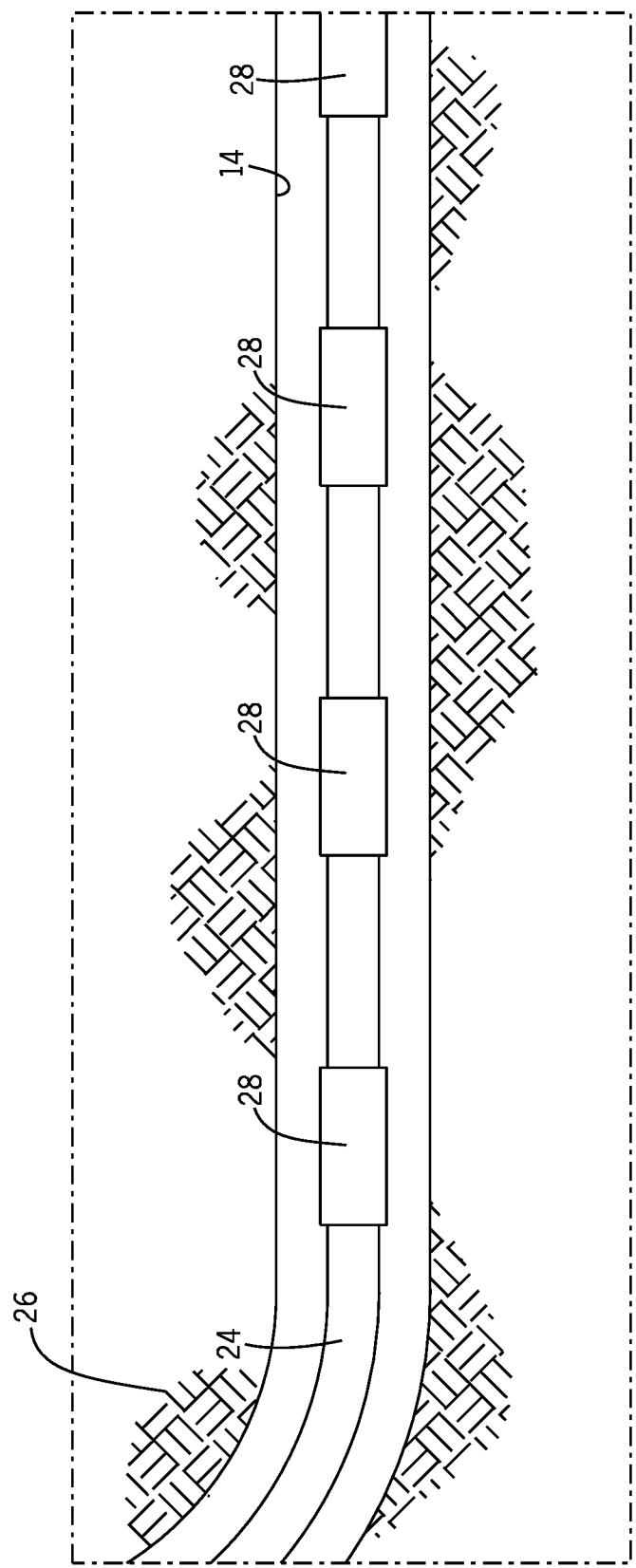
FIG. 2 depicts a portion of the well of FIG. 1 and includes a portion of a completion string having inflow control valves for controlling fluid flow from a formation into the completion string in accordance with one embodiment.

A portion of a lower completion in the well 14 is generally depicted in FIG. 2 as including a completion string 24 installed in a producing interval of the well 14. Pressurized fluid from a formation 26 flows into the completion string 24, through which the fluid flows up the well. In various embodiments, the completion string 24 is a tubular. While generally depicted as production tubing in FIG. 2, the completion string 24 could take other forms. For instance, the completion string 24 could be a casing string or a liner. In at least some embodiments, the producing interval of the well 14 extends through a hydrocarbon reservoir and the well 14 produces hydrocarbon fluids (e.g., oil or gas) through the completion string 24. But the techniques described herein are not limited to use with hydrocarbon fluids or within oilfield contexts.

The completion string 24 may include inflow control devices that control the rate at which the pressurized formation fluid flows into the completion string 24. For instance, as generally depicted in FIG. 2, the completion string 24 includes inflow control valves 28 that can be opened and closed to control flow of formation fluid into the completion string 24. Although just a handful of inflow control valves 28 are depicted in FIG. 2, it will be appreciated that a well could have any suitable number of such inflow control valves. For example, the well 14 could be a segmented, multi-stage well in which formation fluid is produced from different zones, and flow from the different zones can be individually controlled with inflow control valves 28 installed in the different zones. In some embodiments, the inflow control valves 28 are spaced apart at intervals between forty and one hundred meters or in a narrower range, such as between fifty and seventy meters. The intervals can be regular (e.g., with the inflow control valves 28 spaced at sixty-meter intervals along the completion string 24) or irregular (with the spaces between adjacent valves 28 differing along the string 24).

The desire to produce hydrocarbon fluids efficiently, economically, and in an environmentally-friendly manner has promoted the development of extended reach horizontal and multilateral wells that enable greater reservoir contact. However, the increased wellbore length has led to some production problems. Higher pressure around the heel section resulting from frictional pressure drop of fluid flow in the wellbore may induce non-uniform fluid influx along the length of the wellbore and higher production rates at the heel. This often leads to early break-through of water or gas, which causes a reduction in oil recovery and uneven sweep of the drainage area. Inflow control valves can be used with accurate measurements of phase fractions in the produced fluid (e.g., proportions of oil, water, and gas in a multiphase fluid) to control fluid production rates at different locations along the well.

When a mixture of oil, gas, and water is flowing in the production tubing or other completion string, measuring the various volume fractions (e.g., "water cut" and "gas cut") downhole can be done in several ways involving different physical principles. In some instances, volume fractions are calculated based on the measurement of the electrical resistivity or the capacitance of the mixture, which are functions of the water content. However, while the resistivity measurement may provide for accurate water cut measurements when water cut is in the range of 50%-100% and the capacitance measurement may provide for accurate water cut determinations when water cut is in the range of 0%-30%, these measurements may lead to inaccurate calculations of water cut at other levels (e.g., due to reliance on modeling and extrapolation, and to the complex dynamics of the mixture where phase inversion might happen). Further, electric measurement typically does not distinguish between gas and oil contents.

In accordance with certain embodiments of the present disclosure, however, the total flow rate of a multiphase fluid (e.g., a fluid mixture having water, oil, and gas) and individual phase fractions of the fluid are measured with temperature sensors. In some instances, and as described in greater detail below, the phase fractions and the total flow rate can be measured at the same location with a thermal sensor at that location. Additional thermal sensors can be used to measure the phase fractions and the total flow rate at other locations in the well (e.g., for cross-correlation purposes).

Figure 3:
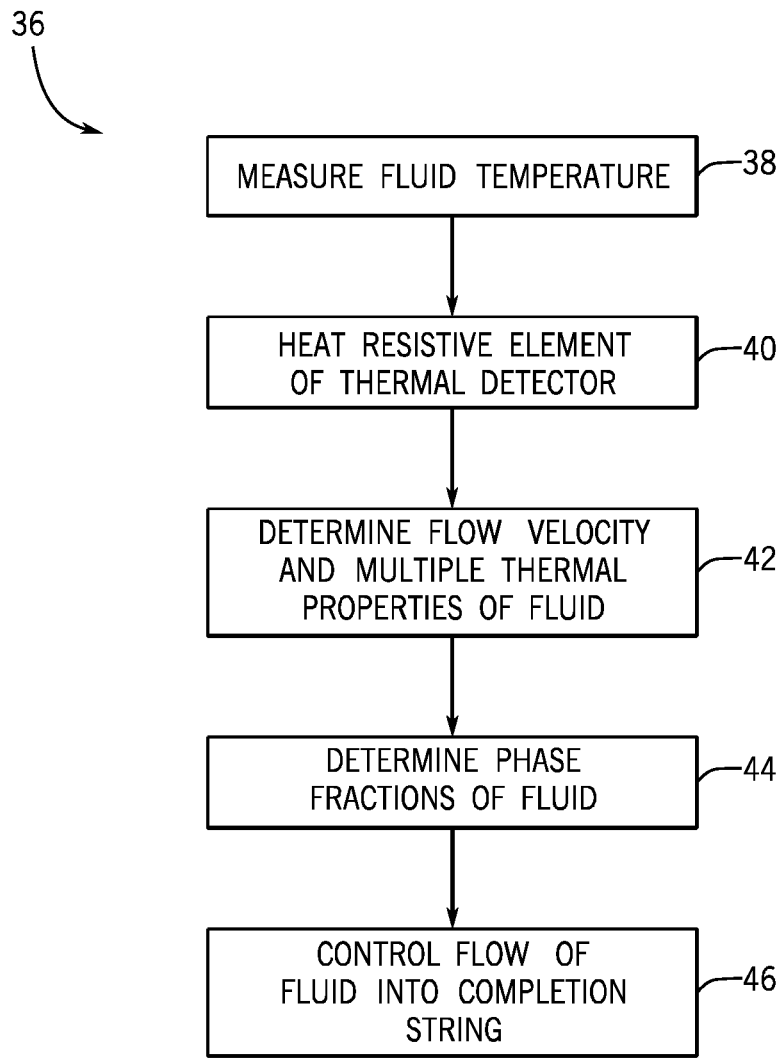
FIG. 3 is a flowchart representing a process for determining phase fractions of a fluid within a conduit, such as the completion string of FIG. 2, using measured characteristics of the fluid, including thermal characteristics, in accordance with one embodiment.

One example of a process for determining phase fractions of a fluid is generally represented by the flowchart 36 in FIG. 3. This process includes measuring (block 38) a temperature of a fluid flowing through a conduit (e.g., the completion string 24) and heating (block 40) a resistive element of a thermal detector (e.g., by applying power to a resistive element of thermal detector 56 of FIGS. 4 and 5) so that heat from the resistive element is imparted to the flowing fluid. In at least one embodiment, the resistive element of the thermal detector is located at a position along the completion string 24 that is downstream from the position at which the temperature measurement of block 38 occurs.

The flow velocity and multiple thermal properties of the fluid can be determined (block 42) in any suitable manner, such as via the thermal detector. As described below, the thermal properties of the fluid that can be determined with the thermal detector include thermal conductivity and thermal diffusivity. In one embodiment described in greater detail below, the resistive element of the thermal detector is heated at a constant temperature to assess its constant temperature response. The resistive element can then be heated in a pulse mode in which a series of impulses are applied and the time response is recorded to enable the determination of the flow velocity and multiple thermal properties, such as thermal conductivity and thermal diffusivity (or thermal capacity). These or other thermal properties determined with the thermal detector can be used with the determined flow velocity to determine phase fractions of the fluid (block 44). Further, knowledge of the determined phase fractions can be used to control flow of fluid into the completion string 24 (block 46), such as by operating an inflow control valve 28 to control flow of formation fluid into the string 24. In at least some instances, this technique is repeated with multiple thermal detectors installed at different locations along the completion string 24. Resistive elements of the thermal detectors may be heated at the different locations to determine thermal properties, flow velocities, and phase fractions of the fluid at those locations, and multiple inflow control valves 28 can be operated to control flow into the string 24 through the valves 28 (e.g., to regulate production rates in different zones of the well and promote a desired flow profile).

The thermal properties of the fluid in a conduit can be determined in any suitable manner. In one embodiment generally depicted in FIG. 4, an internal section of a portion of the completion string 24 is shown as having a bore 52 and various sensors for measuring properties of the formation fluid conveyed through the bore. The illustrated sensors include thermal detectors 54 and 56, as well as pressure sensors 58 and 60, but it will be appreciated that the number, type, and configuration of sensors may differ in other instances. One or more of the sensors can be installed across a Venturi throat 64 of the completion string 24. For example, the pressure sensor 58 can be installed at the Venturi throat 64 and the pressure sensor 60 can be installed at a distance away from the Venturi throat, allowing measurement of a differential pressure 62 that can be used to calculate the volumetric flow rate of the fluid. In other instances, however, the volumetric flow rate is also or instead calculated from thermal properties of the fluid measured with one or more of the thermal detectors.

Figure 5:
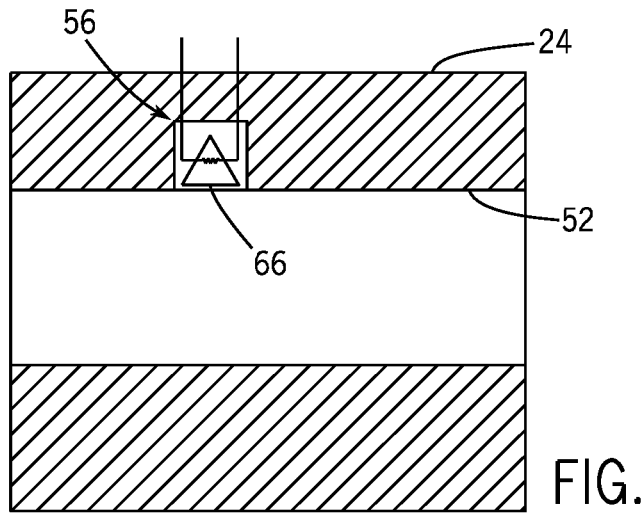
FIG. 5 generally depicts a thermal detector of the completion string of FIG. 4 as having a resistive heating element that can be used for determining thermal characteristics of fluid within the completion string in accordance with one embodiment.
Figure 6:
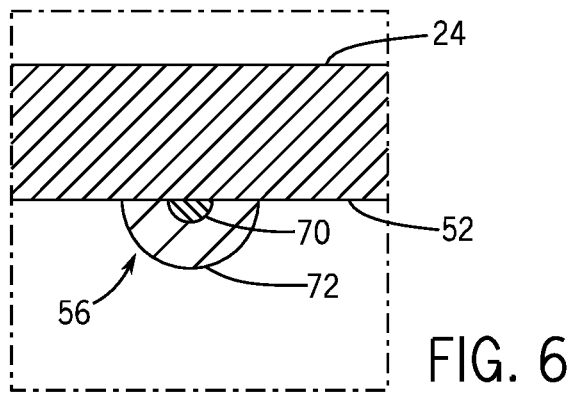
FIG. 6 generally depicts the thermal detector of FIG. 5 as a hot-wire anemometer in accordance with one embodiment.

In some instances, the thermal detector 54 is a passive thermal device that measures temperature of the fluid in the completion string, while the thermal detector 56 is an active device for determining additional thermal properties of the fluid. In other instances, the thermal detector 54 may instead be an active device similar or identical to the thermal detector 56. The thermal detector 56 can include a resistive element 66, as generally depicted in FIG. 5. When in the presence of flow, power may be applied to the resistive element and various properties of the fluid can be determined by the response of the resistive element. In at least one embodiment, as schematically depicted in FIG. 6, the thermal detector 56 includes a hot-wire anemometer having a resistive heating element 66 in the form of a wire 70 (e.g., a platinum wire with a measurable resistance). A thermally conductive insulator 72 allows heat generated by the powered wire 70 to pass to the fluid within the bore 52 while electrically isolating the wire 70 from the fluid. Heat conveyed from the wire 70 through the sensor body (insulator 72) dissipates into the fluid via convection.

When oil, gas, and water are flowing as emulsions or in single phase, the properties can be considered to be averaged by experimental laws, with the fluids having relative volume fractions ($\phi_w$, $\phi_o$, $\phi_g$) linked by:

$$\phi_w + \phi_o + \phi_g = 1 \qquad [1]$$

Thus, extensive data may be weighted by $\phi_i$ (with subscript i replaced with one of subscripts m, w, o, and g referring to mixture, water, oil, and gas, respectively):

Fluid Density ($\rho$)

$$\beta_m = \rho_w \phi_w + \rho_o \phi_o + \rho_g \phi_g \qquad [2]$$

Thermal Conductivity (k)

$$1 = \frac{k_w}{k_m}\phi_w + \frac{k_o}{k_m}\phi_o + \frac{k_g}{k_m}\phi_g \qquad [3]$$

Calorific (Heat) Capacity ($C_p$)

$$\rho_m C_{pm} = \rho_w C_{pw}\phi_w + \rho_o C_{pg}\phi_o + \rho_g C_{pg}\phi_g \qquad [4a]$$

Diffusion Coefficient (D), where $D_i = k_i/\rho_i C_{pi}$ $$1 = \frac{D_w}{D_m}\phi_w + \frac{D_o}{D_m}\phi_o + \frac{D_g}{D_m}\phi_g \qquad [4b]$$

With the volumetric flow-rate being $Q_m = S_p U_m$ ($S_p$ being the area of the conduit at the thermal sensor and $U_m$ being the flow velocity at the thermal sensor), the mass flow-rate ($\rho Q$) obeys the same breakdown:

$$\beta_m Q_m = \rho_w Q_w \phi_w + \rho_o Q_o \phi_o + \rho_g Q_g \phi_g \qquad [5]$$

In at least some embodiments, thermal coefficients are measured in the presence of flow by the same set of thermal sensors without the need to create a dead zone where the fluid is at rest. Flow rate of the fluid can be measured with two thermal sensors: one upstream sensor in "passive" mode (e.g., thermal detector 54) to measure $T_0$ (the reference temperature, which might depend on the fluid phase) and a heated sensor (e.g., thermal detector 56) at temperature $T_s$ to estimate the fluid mass flow-rate.

Flow velocity can be measured by feeding the heat element (e.g., resistive element 66) of the sensor with a power $RI^2$ to maintain it at a constant temperature and deducing the velocity by the knowledge of the current and the voltage supplied to the heat element. King's Law (experimental) in steady conditions is given by:

$$RI^2 = (\alpha + \beta U_m^n)(T_0 - T_s) \qquad [6]$$

R and I are under control of the operator and $T_0$ and $T_s$ are measured. The power put in the heat element is then known ($W_0 = RI^2$), while $\alpha$, $\beta$, and n are calibration coefficients that depend on the fluid properties and the geometrical factors around the sensor. The temperature of the sensing element of a thermal conductivity detector (TCD), such as thermal detector 56, is known by the independent measurement of V and I (voltage and current feeding the thermal conductivity detector, TCD)

$$[T_s - T_0] = \frac{1}{\alpha_T}\left(\frac{R}{R_0} - 1\right) = \frac{1}{\alpha_T}\left(\frac{V}{IR_0} - 1\right) \qquad [7]$$

When the heated temperature sensor is in contact with the fluid at rest (or at very low flow rates) at a temperature $T_0$, a thermal jump $T_s - T_0$ of the heated temperature sensor will result in heating the fluid with a time history which reflects its thermal characteristics.

When the thermal sensor is heated by a current I passing through the resistive heating element with resistance $R_{TCD}$, the power provided to the resistor is $R_{TCD}I^2$ (in watts). The sensor in contact with the fluid will lose its energy, and the temperature $T_s - T_0$ reaches a limit which depends on the calorific capacity of the fluid and the heat flux at the surface of the sensor. (This is valid under the assumption that the insulator, such as insulator 72, around the resistive heating element of the thermal sensor does not pump heat in the system.)

As an example, the sensor surface touching the fluid can be made of a diamond or quartz layer because of their high thermal conductivity (and diffusion coefficient). The temperature inside the sensor can be considered constant in space (but can depend on time), and:

$$\rho_{Dia} C_{Dia} \frac{\partial \langle T \rangle}{\partial t} U_{TCD} = R_{TCD}I^2 + k_{fluid} 2\pi r_{dia}^2 \frac{\partial T}{\partial r}\bigg|_{r=r_{dia}} \qquad [8]$$

where $U_{TCD}$ is the volume of the sensor, $\rho_{Dia} C_{Dia}$ is the calorific capacity of the sensor material, and $\langle T \rangle$ is the average temperature.

When the thermodynamic system is in equilibrium, the heat equation does not depend on time and $\langle T \rangle$ is constant. For the sake of simplification, the TCD is considered as a small hemisphere (e.g., as generally shown in FIG. 6) of diameter $2r_{dia}$ with a surface $2\pi r_{dia}^2$ in contact with the fluid at $r = r_{dia}$. At this interface the temperature is continuous, and the thermal flux is constant. Assuming $U_m = 0$, the temperature field is assumed to be spherically symmetrical and in steady state. In the spherical coordinate system, the energy equation can be written for an incompressible fluid as follows:

$$\frac{1}{r}\frac{\partial^2 rT}{\partial r^2} = 0 \qquad [9]$$

with the boundary condition in the fluid:

$$T(r = r_{dia}) = T_s, \; T(\infty) = T_0 \qquad [10a]$$

The solution of equation [9] is given by:

$$T = T_0 + \frac{r_{dia}(T_s - T_0)}{r}, \qquad [10b]$$

and the temperature derivative at the interface is:

$$\frac{\partial T}{\partial r}\bigg|_{r_{dia}^+} = -\frac{(T_s - T_0)}{r_{dia}} \qquad [10c]$$

Equation [10c] is then substituted in eq. [8] in order to determine $k_{fluid}$:

$$R_{TCD}I^2 = k_{fluid} 2\pi r_{dia}(T_s - T_0) \Rightarrow k_{fluid} = \frac{R_{TCD}I^2}{2\pi r_{dia}(T_s - T_0)} \qquad [11]$$

In equation [11], part of the energy can be lost by conduction in the material which is not totally insulated. In absence of flow, King's Law (equation [6]) depends on the coefficient $\alpha$ that is not known. Using a known fluid of thermal conductivity $k_{fref}$, the power supplied to the TCD is:

$$\frac{R_{TCD}I^2}{(T_s - T_0)} = \frac{\mathcal{L}}{(T_s - T_0)} + 2\pi r_{dia} k_{fref} \qquad [12]$$

where $\mathcal{L}/(T_s - T_0)$ represents the leakages of the thermal energy through the system. It can be estimated once for each sensing device with reference fluids of known thermal conductivities $k_{fref}/(T_s - T_0)$. $\mathcal{L}$ is a calibration factor and represents an offset in estimation of energy balance.

In no-flow conditions, the sensor excitation can be written:

$$\frac{R_{TCD}I^2(t)}{(T_s - T_0)} = \frac{\mathcal{L}}{(T_s - T_0)} + \frac{E(t)}{(T_s - T_0)} \qquad [13]$$

In terms of distribution this can be written:

$$\frac{R_{TCD}I^2(t) - \mathcal{L}}{(T_s - T_0)} = \int_{-\infty}^{\infty} \delta(t - \tau) \frac{E(\tau)}{(T_s - T_0)} d\tau \qquad [14]$$

where $\delta(t - \tau)$ is the Dirac impulse function. The term on the left is measurable, with $R_{TCD}I^2 = VI$, and V and I being known separately. The sensor temperature is also known by $R_{TCD}$ (equation [8]) as well as $\mathcal{L}$ given by equation [12].

The Dirac impulse excitation can generate an elementary solution of the heat equation:

$$T = \frac{M}{\sqrt{4\pi D t^3}} e^{-\frac{r^2}{4Dt}} \qquad [15]$$

With:

$$D = \frac{k_{fluid}}{\rho_{fluid} C_{fluid}} \qquad [16]$$

The boundary conditions can be written for the interface between the sensor and the fluid (at $r_{dia}$):

$$T(r_{dia}, t) = \frac{M}{\sqrt{4\pi D t^3}} e^{-\frac{r_{dia}^2}{4Dt}} \qquad [17]$$

In order to visualize the basic solution, a non-dimensional formulation may be built:

$$r = r_{dia}\chi, \; t = \frac{r_{dia}^2}{D_{fluid}}\tau, \; \theta = \frac{T(r,t) - T_0}{T_s - T_0}, \qquad [18]$$

Equation becomes:

$$\Theta(1, \tau) = \frac{r_{dia} D M}{\sqrt{4\pi}} \frac{e^{-\frac{1}{4\tau}}}{\tau^3} = M_1 \frac{e^{-\frac{1}{4\tau}}}{\tau^3} \qquad [19]$$

Figure 7:
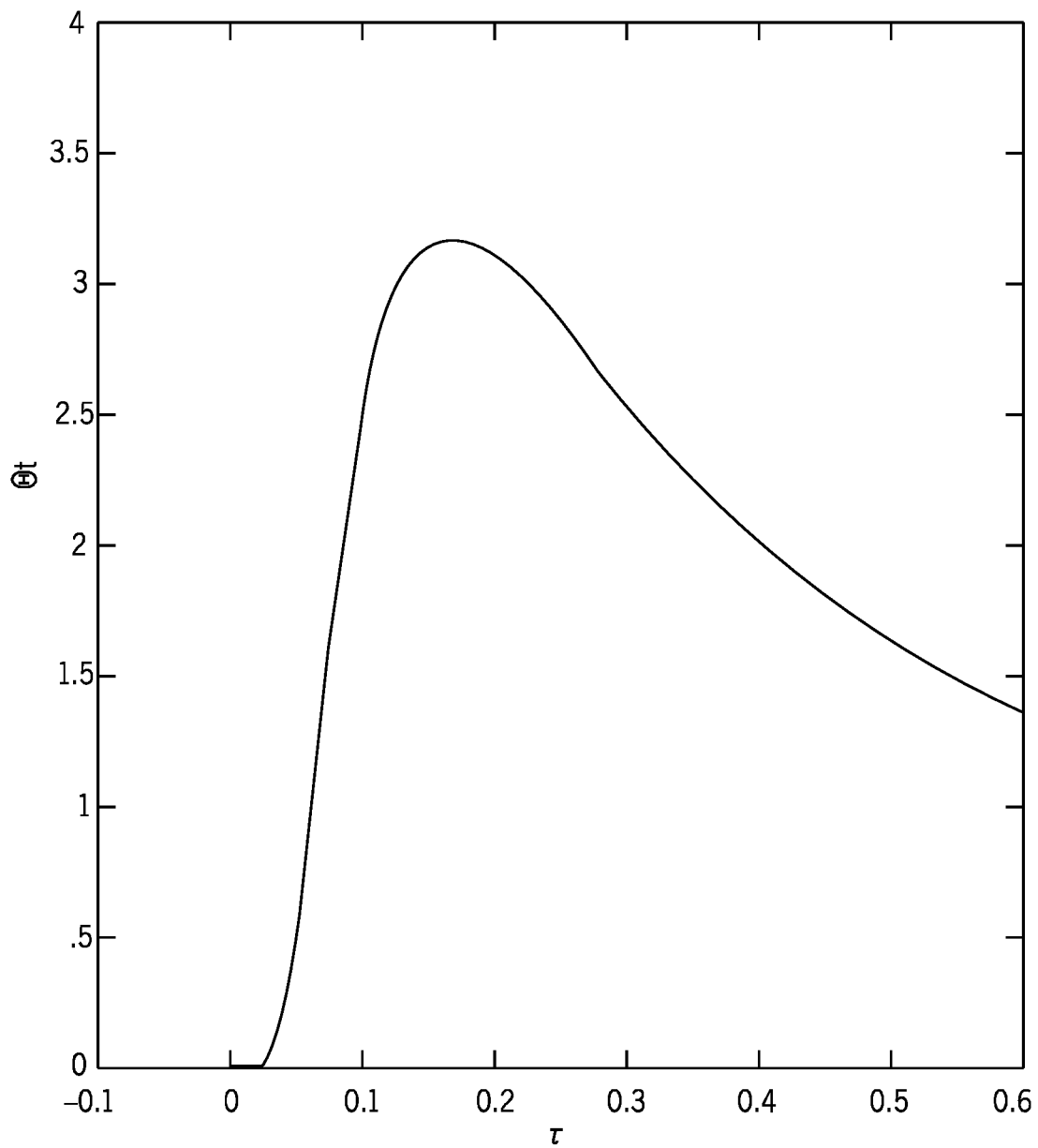
FIGS. 7 and 8 are graphs representing an impulse response and a quasi-impulse response of a thermal sensor in accordance with one embodiment.
Figure 8:
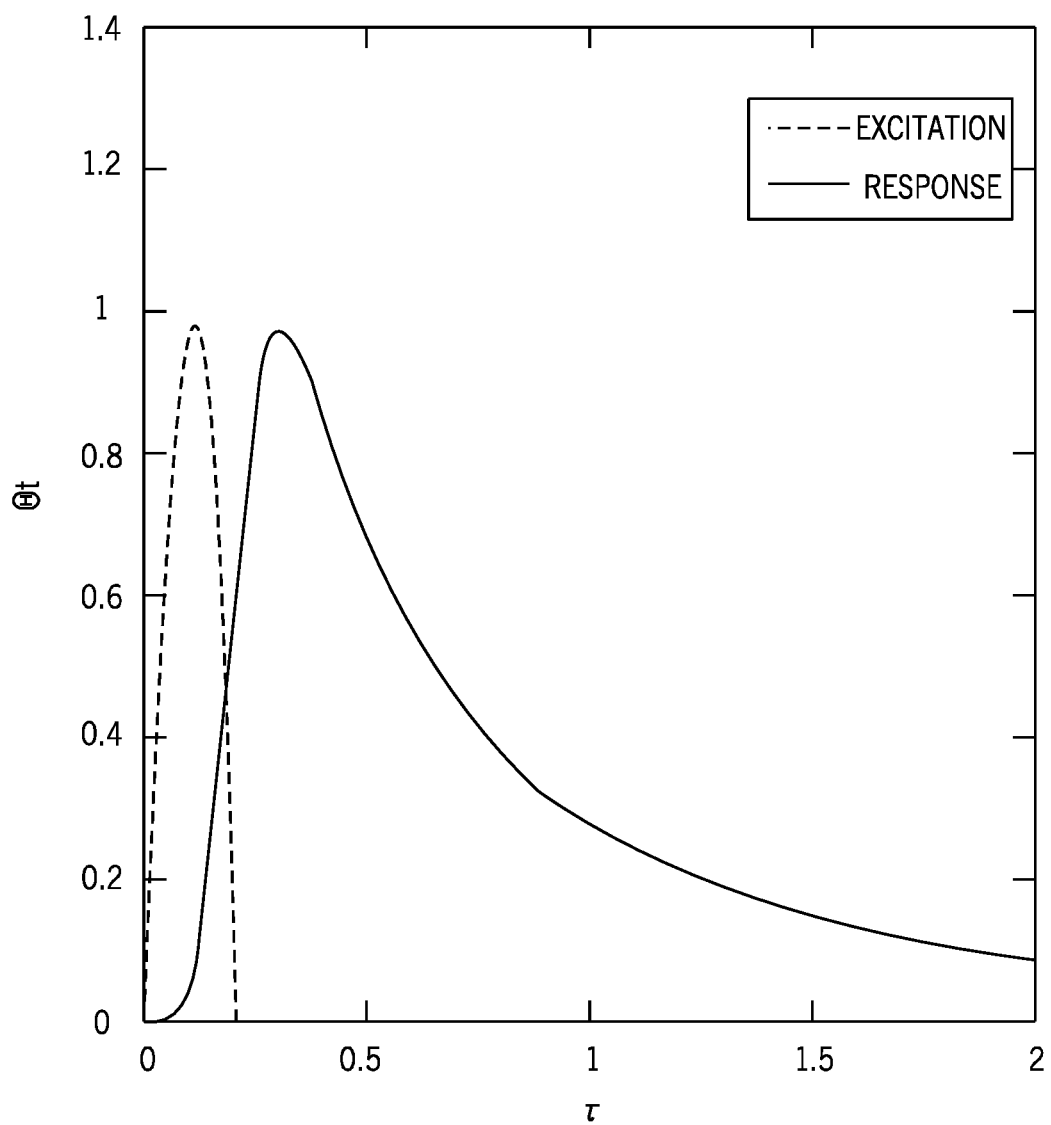

In equation [19], the amplitude factor $M_1$ is a measured data point. For $\tau = Dt/r_{dia}^2$, the non-denominational time of maximum of $\Theta$ in this example is obtained for $\tau = 0.1667$ (as shown in FIG. 7) and $t_{max}$ can be measured from $D = 0.1667 \; r_{dia}^2/t_{max}$. An example of an impulse response of a thermal sensor in a no-flow condition is depicted in FIG. 7. This impulse response is valid for thermal excitations of short time (e.g., Dirac impulse functions) compared to the time of response. The amplitude of the curve depicted in FIG. 7 is arbitrary, but can be determined through measurement of T(t) by the sensor. An example of a non-dimensional response of the thermal sensor in no-flow conditions with a quasi-impulse excitation is depicted in FIG. 8 response of the thermal sensor in a no-flow condition. In the example depicted in FIG. 8, $\tau_{max} = 0.28$. Given that $D_{fluid} = \tau_{max} r_{dia}^2/t_{max}$, a known excitation leads to time scaling that allows $D_{fluid}$ to be determined. In other embodiments, other excitation functions (e.g., more complex excitation functions) could be implemented.

For a given excitation the evolution of the temperature inside the sensor is a convolution of the elementary solution and the excitation:

$$T(r_{dia}, t) = M_2 \int_{-\infty}^{\infty} \frac{e^{-\frac{1}{4\tau}}}{\tau^3} E(t - \tau) d\tau \qquad [20]$$

A reasonable 'real' impulse function could be expressed as:

$$E(t) = \frac{1}{t_{ex}}\left(1 - \cos\left(2\pi\frac{t}{t_{ex}}\right)\right), \; t \leq t_{ex}, E(t) = 0, \; t \leq 0 \text{ and } t \geq t_{ex} \qquad [21]$$

The impulse integral is constant $\int_0^{t_{ex}} E(t)dt = 1$ and the impulse goes to infinity when $t_{ex} \to 0$. The sensor temperature can then be obtained by convolution.

Typical thermal properties of representative sensor housing materials and fluids are provided in the following table:

TABLE

Typical thermal properties of representative solids and fluids

| | Thermal diffusivity, D (in m²/s) | Thermal conductivity, k (in W/m · K) | D/D$_{water}$ | k/k$_{water}$ |
|---|---|---|---|---|
| Nickel (Inconel) | 23 × 10⁻⁶ | 91 | 140 | 150 |
| PEEK (insulator) | 1.9 × 10⁻⁷ | 0.25 | 1.2 | 0.4 |
| Diamond | (3.0-11) × 10⁻⁴ | 1000-3000 | <4300> | <3000> |
| Mineral oil (100° C.) | 7.38 × 10⁻⁸ | 0.16 | 0.46 | 0.27 |
| Water at 25° C. | 0.16 × 10⁻⁶ | 0.6 | 1 | 1 |
| Air 200 C.-600 bar | 5.6 × 10⁻⁶ | 0.03 | 35 | 0.05 |

The contrast between mineral oil (similar to crude oil), air (similar to methane), and water are very high either for k and D.

While determination of various thermal properties is described above in no-flow conditions, in at least some embodiments the thermal properties are determined in the presence of fluid flow. Linearity of the various phenomena can be assumed in terms of power put inside the thermal device. In certain embodiments, the constant temperature response of the thermal device is first established so as to provide a function of the fluid velocity but with unknown calibration coefficient. Then a series of impulses can be put in the thermal device (applied to the resistive heating element 66) to assess the thermal properties of the fluid.

If the fluid has very low thermal conductivity, any change of the heater supply will result in higher temperature reach by the sensor and if the thermal capacity (or the thermal diffusivity) is low, the response time of the heater will be shorter (little amount of energy will be radiated in the fluid). In some embodiments, the thermal measurements can be performed with sensors at different positions in the completion string 24, such as upstream of a Venturi throat 64, at the Venturi throat 64, and possibly downstream of the Venturi throat 64—the first giving a reference of velocity measurement, the second providing another velocity measurement (with a different calibration factor), and the third one possibly the thermal properties of mixed fluids. The comparison of upstream and throat measurements give a velocity ratio in the same ratio as the cross-sectional areas of the upstream and throat locations, providing an independent relationship. For high flow rates and compressible flows, a change in forecasted velocities can be an indication of gas.

In the case of a steady flow, a corrected King's Law can be expressed as:

$$\frac{R_{TCD}I_U^2 - \mathcal{L}}{(T_s - T_0)} = (2\pi r_{dia} k_{fluid} + \beta U_m^n) \qquad [22]$$

Here, $\mathcal{L}$ is known by calibration but $k_{fluid}$ and $U_m^n$ are not distinguished one from the other, $\beta$ depends on the known system geometry and on the unknown parameters $k_{fluid}$ and $D_{fluid}$, and $I_U^2$ depends on the amount of advected thermal energy. $T_s$ can be maintained constant by a feedback loop on $R_{TCD}I_U^2$. The excitation balances several contributions:

$$\frac{R_{TCD}I_U^2 - \mathcal{L}}{(T_s - T_0)} + \frac{R_{TCD}I_p^2(t)}{(T_s - T_0)} = (2\pi r_{dia}k_{fluid} + \beta U_m^n) + F(t) \quad [23]$$

Here, F(t) is the non-steady response of an excitation $$\frac{R_{TCD}I_p^2(t)}{(T_s - T_0)} \quad (L)$$

It can be assumed that the conditions of temperature field of F(t) are similar to the case of no flow, since any energy above $R_{TCD}I_U^2$ is advected by the flow. An additional impulse will be heating the fluid like in no-flow condition (by assumed linearity). Then, amplitude and response time can be used to estimate separately $k_{fluid}$ and $D_{fluid}$ (or $\rho C_{fluid}$).

The steady part is:

$$\frac{R_{TCD}I_U^2 - \mathcal{L}}{(T_s - T_0)} = (2\pi r_{dia}k_{fluid} + \beta U_m^n) \quad [24]$$

It may be assumed to be decoupled from the second one:

$$\frac{R_{TCD}I_p^2(t)}{(T_s - T_0)} = E(t) \quad [25]$$

with a temperature field following same equations [20].

By using first the constant temperature control $$\frac{R_{TCD}I_U^2 - \mathcal{L}}{(T_s - T_0)},$$

and then a series of pulses as by equation [20], and with the result of convolution similar to equations [21] and [22], we can write:

$$\frac{R_{TCD}I_p^2(t)}{(T_s - T_0)} = \frac{\langle R_{TCD}I_p^2\rangle}{(T_s - T_0)}\int_{-\infty}^{\infty}\delta(t-\tau)E(\tau)d\tau \quad [26]$$

$$T(t) = \int_{-\infty}^{\infty} E(t-\zeta)\frac{M}{\sqrt{4\pi Dt^3}}e^{-\frac{r^2}{4Dt}}d\zeta$$

with $\langle R_{TCD}I_p^2\rangle$ being the average of $R_{TCD}I_p^2(t)$. The solution of this is a convolution exhibiting a maximum (as in FIG. 8) since T(t) and E(t) can be measured, M can be inferred, and the time for maximum can be inversed to get the diffusion coefficient D.

To close the loop of unknowns, equations [7] and [26] can be used to calculate the fluid conductivity $k_{fluid}$:

$$\rho_{Dia}C_{Dia}\frac{\partial T}{\partial t}\frac{4\pi r_{dia}^3}{3} = \quad [27]$$

$$\langle R_{TCD}I_p^2\rangle\int_{-\infty}^{\infty}\delta(t-\tau)E(\tau)d\tau - k_{fluid}\frac{M\pi^{1/2}r_{dia}^3}{2D^{1/2}}\int_{-\infty}^{\infty}E(t-\zeta)\frac{e^{-\frac{r_{dia}^2}{4Dt}}}{t^{5/2}}d\zeta$$

since each of the time-dependent quantities is measurable. This enables each of the terms of equation to be defined, with the parameters $\beta U_m^n$ known for various reference fluids.

In at least one embodiment, temperature measurement can be calculated according to equation [7], in which V, I, and R are measured values and $\alpha_T$ and $R_0$ are input parameters. Equation [12] can be used for no-flow calibration in reference fluids with $k_{fref}$ for leakages $\mathcal{L}$. After this calibration, three unknown parameters are left in equation [22] (i.e., $k_{fluid}$, $\beta$, and $U_m$), which can be solved (along with $D_{fluid}$ or $\rho C_{fluid}$) as discussed above. Any three of phase equations [1]-[5] could then then be used to calculate the phase fractions of oil, water, and gas in the fluid conveyed through completion string 24. For example, with $k_m$ and $D_m$ measured as described above, and values for the thermal conductivities and diffusion coefficients of the individual phases provided as input parameters (e.g., from the entries for mineral oil, water, and air in the table above), the phase equations [1], [3], and [4b] can be solved to determine the phase fractions ($\phi_w$, $\phi_o$, $\phi_g$).

Figure 4:
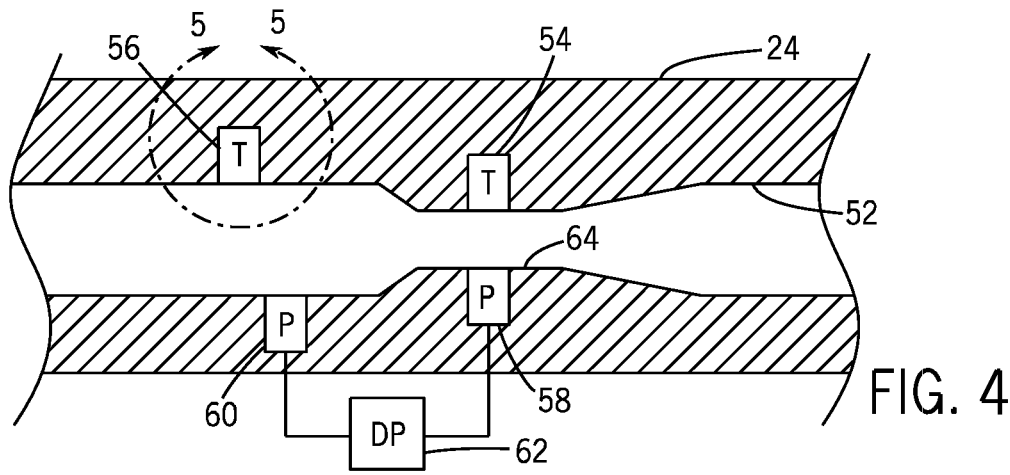
FIG. 4 depicts a cross-section of a portion of the completion string of FIG. 2 as having a Venturi throat and various sensors for measuring properties of the formation fluid within the completion string in accordance with one embodiment.

As shown in FIG. 4 and generally described above, the fluid flow line (e.g., completion string 24) can be equipped with a Venturi throat 64 and two pressure sensors 58 and 60 for getting information on the fluid flow-rate $Q_t$:

$$Q_t = C_D\frac{\pi d^2}{4}\frac{1}{\sqrt{1-\beta^4}}\sqrt{\frac{2\Delta P}{\rho_m}} \quad [28]$$

In equation [28], $C_D$ and $\rho_m$ are fluid dependent:

$$C_D = \frac{2.3794}{\text{Re}_m^{0.412}}, \text{ for } \text{Re}_m \in [10^2, 2.10^6] \quad [29]$$

with:

$$\text{Re}_m = \frac{\rho_m U_m D}{\mu_m} = \frac{4\rho_m Q}{\pi\mu_m D}. \quad [30]$$

Each coefficient indexed by m is the mixture averaged value, $\rho_m$ is given by equation [2], and (o in w): $\mu_m = \mu_o(1-\phi_w)^{-2.5}$, (w in o): $\mu_m = \mu_w\phi_w^{-2.5}$ \quad [31]

where $\mu_m$ is given by equation for two cases—oil in a water major phase, or water in an oil major phase. With each phase being determinable as described above, the water cut can be known and the pressure interpretation can be completed.

Formally, King's Law is valid at the Venturi throat and upstream or downstream of the Venturi restriction. A Venturi diffuser (the divergent part of the Venturi tube) plays the role of a turbulent mixer by flow separation in the pressure recovery region, whereas the convergent part of the Venturi is a stabilizer that keeps the streamlines parallel. Therefore, a velocity measurement between the upstream part of the Venturi and the Venturi throat is supposed to be consistent, whereas a measurement between the Venturi throat and downstream of the Venturi can be of different kind. This is an additional indicator of the fluid phase distribution in a measurement conduit. The described procedure to evaluate the flow velocity and the phase distribution can be performed as described above, while providing additional information on $U_m$ and then $\rho_m$ as a quality check parameter. A possible inconsistency between the Venturi throat and the downstream part can show the effect of mixing, with individual phases losing their signature.

The analysis system 20 of the system 10 can be used to implement the functionality described above. For example, in at least some embodiments the analysis system 20 is operable to determine thermal characteristics of a fluid in a conduit with a thermal detector and to determine phase fractions of the fluid using the determined thermal characteristics. The analysis system 20 may also operate control flow of fluid into the conduit in some instances, such as by operating inflow control valves 28 of a production tubing or other completion string 24.

Figure 9:
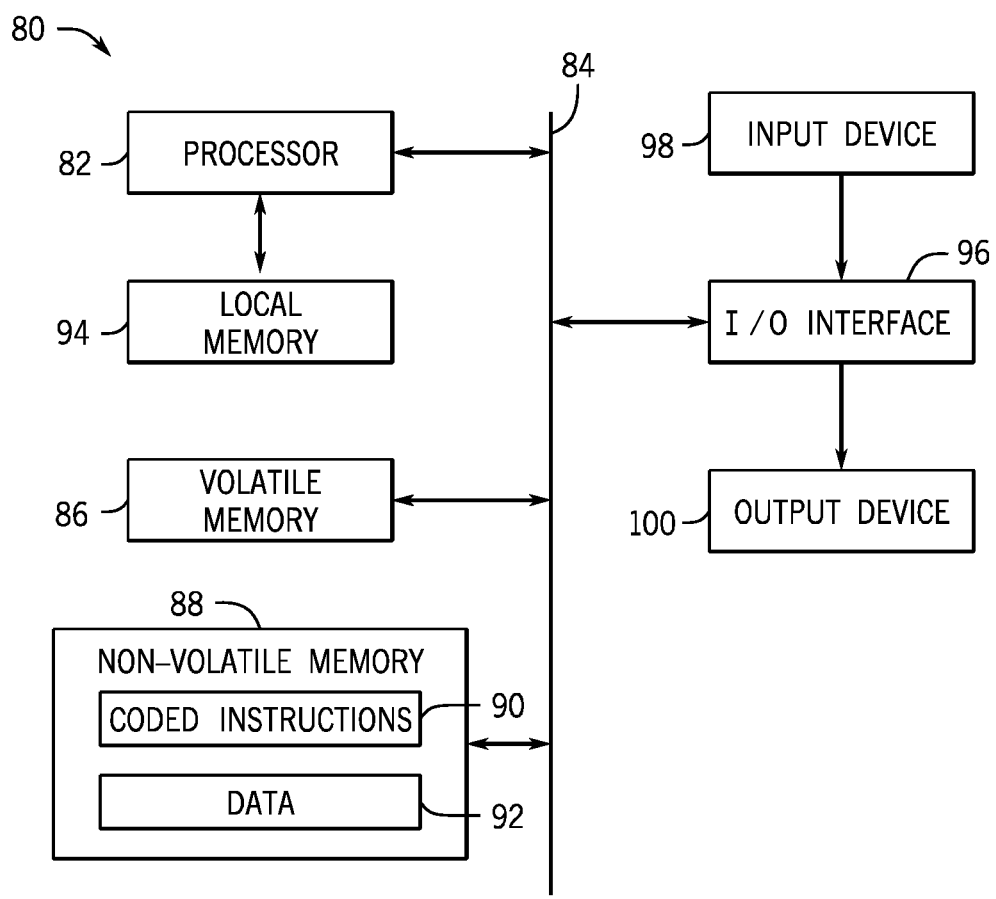
FIG. 9 is a block diagram of components of one example of the analysis system of FIG. 1 that can be used to determine various characteristics of a fluid within the completion string, such as thermal characteristics and phase fractions, in accordance with one embodiment.

The analysis system 20 can be provided in any suitable form, such as a processor-based system. An example of such a processor-based system 80 is generally provided in FIG. 9. In this depicted embodiment, the system 80 includes at least one processor 82 connected by a bus 84 to volatile memory 86 (e.g., random-access memory) and non-volatile memory 88 (e.g., flash memory and a read-only memory (ROM)). Coded application instructions 90 (e.g., instructions for calculating thermal properties, flow rates, and phase fractions, as described above) and data 92 (e.g., thermal property parameters of materials and fluids of interest, as in the table above) are stored in the non-volatile memory 88. The instructions 90 and the data 92 may also be loaded into the volatile memory 86 (or in a local memory 94 of the processor) as desired, such as to reduce latency and increase operating efficiency of the system 80. The coded application instructions 90 can be provided as software that may be executed by the processor 82 to enable various functionalities described above. In at least some embodiments, the application instructions 90 are encoded in a non-transitory, computer-readable storage medium, such as the volatile memory 86, the non-volatile memory 88, the local memory 94, or a portable storage device (e.g., a flash drive or a compact disc).

An interface 96 of the system 80 enables communication between the processor 82 and various input devices 98 and output devices 100. The interface 96 can include any suitable device that enables such communication, such as a modem or a serial port. In some embodiments, the input devices 98 include one or more sensing components of the system 10 (e.g., sensors 54, 56, 58, and 60) and the output devices 100 include displays, printers, and storage devices that allow output of data received or generated by the system 80.

Various methods and systems related to fluid analysis via thermal properties are described above. From this description, it will be appreciated that one method in accordance with the present techniques can include determining thermal properties of a fluid flowing through a conduit and determining phase fractions of the flowing fluid using the determined thermal properties and a flow rate of the flowing fluid. The conduit could be located downhole within a well or at the surface. Determining the thermal properties can include applying electrical impulses to a heating element of a thermal detector positioned such that heat from the heating element is advected by the flowing fluid, and assessing the thermal properties of the flowing fluid via the response of the heating element. In some instances, the method can also include determining the flow rate of the flowing fluid via the thermal detector. Further, determining the thermal properties of the fluid can include correlating amplitude responses of the thermal detector to the electrical impulses with thermal diffusivity and thermal conductivity of the fluid. Determining the thermal properties of the fluid may also include determining the thermal diffusivity of the fluid through identification of a maximum amplitude response at a fixed, non-dimensional time.

The foregoing outlines features of several embodiments so that those skilled in the art may better understand aspects of the present disclosure. Those skilled in the art should appreciate that they may readily use the present disclosure as a basis for designing or modifying other processes and structures for carrying out the same purposes or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

The invention claimed is:

1. An apparatus comprising:
a completion string installed in a well, the completion string including a plurality of inflow control valves for controlling flow of formation fluid into the completion string;
a plurality of thermal detectors positioned along the completion string downhole in the well; and
an analysis system operable to:
determine, via the plurality of thermal detectors, thermal characteristics of a downhole fluid flowing through the completion string at the positions of the plurality of thermal detectors;
determine phase fractions of the downhole fluid using the determined thermal characteristics; and
control the inflow control valves based on the determined thermal characteristics of the downhole fluid at the positions of the plurality of thermal detectors.

2. The apparatus of claim 1, wherein the plurality of thermal detectors includes a first thermal detector including a hot wire anemometer and a second thermal detector including a passive temperature sensor, and the analysis system is operable to determine a flow velocity of the downhole fluid using the first and second thermal detectors.

3. The apparatus of claim 1, comprising:
a Venturi throat downhole in the completion string; and
pressure sensors positioned with respect to the Venturi throat to enable measurement of a flow rate of the downhole fluid flowing through the completion string at the Venturi throat.

4. The apparatus of claim 1, wherein the completion string includes production tubing and the plurality of thermal detectors is positioned along the production tubing.

5. A method comprising:
determining thermal properties of a fluid flowing through a conduit, wherein determining the thermal properties includes:
applying electrical impulses to a heating element of a thermal detector positioned such that heat from the heating element is affected by the flowing fluid, and assessing the thermal properties of the flowing fluid via the response of the heating element; and
correlating amplitude responses of the thermal detector to the electrical impulses with thermal diffusivity and thermal conductivity of the flowing fluid; and determining phase fractions of the flowing fluid using the determined thermal properties and a flow rate of the flowing fluid.

6. The method of claim 5, comprising determining the flow rate of the flowing fluid via the thermal detector.

7. The method of claim 5, wherein determining the thermal properties of the flowing fluid includes determining the thermal diffusivity of the flowing fluid through identification of a maximum amplitude response at a fixed, non-dimensional time.

8. An apparatus comprising:
a completion string installed in a well;
a thermal detector positioned along the completion string downhole in the well;
an analysis system operable to determine, via the thermal detector, thermal characteristics of a downhole fluid flowing through the completion string and to determine phase fractions of the downhole fluid using the determined thermal characteristics;
a Venturi throat downhole in the completion string; and
pressure sensors positioned with respect to the Venturi throat to enable measurement of a flow rate of the downhole fluid flowing through the completion string at the Venturi throat.

9. The apparatus of claim 8, comprising a second thermal detector positioned along the completion string downhole in the well,
wherein the thermal detector includes a hot wire anemometer, and the second thermal detector includes a passive temperature sensor, and
wherein the analysis system is operable to determine a flow velocity of the downhole fluid using the thermal detector and the second thermal detector.

10. The apparatus of claim 8, wherein the completion string includes production tubing and the thermal detector is positioned along the production tubing.

* * * * *